United States Patent [19]

Olson

[11] 4,404,257

[45] Sep. 13, 1983

[54] COATED AND ULTRAVIOLET RADIATION STABILIZED POLYCARBONATE ARTICLE

[75] Inventor: Daniel R. Olson, Schenectady, N.Y.

[73] Assignee: General Electric Company, Pittsfield, Mass.

[21] Appl. No.: 253,364

[22] Filed: Apr. 13, 1981

[51] Int. Cl.³ .............................................. B32B 27/36
[52] U.S. Cl. ............................... 428/412; 106/287.12; 427/160; 428/331; 428/424.2; 428/451
[58] Field of Search ............ 428/412, 451, 331, 424.2; 427/160; 106/287.12

[56] References Cited

U.S. PATENT DOCUMENTS

| | | | |
|---|---|---|---|
| 3,309,220 | 3/1967 | Osteen | 427/160 |
| 3,582,398 | 6/1971 | Ringler | 428/412 |
| 3,617,330 | 11/1971 | Peilstocker | 427/160 |
| 3,986,997 | 10/1976 | Clark | 428/412 X |
| 4,027,073 | 5/1977 | Clark | 428/412 |
| 4,146,658 | 3/1979 | Humphrey | 428/412 X |
| 4,159,206 | 6/1979 | Armbruster et al. | 106/287.12 |
| 4,210,699 | 7/1980 | Schroeter et al. | 428/331 |
| 4,224,378 | 9/1980 | Schroeter et al. | 428/412 |
| 4,239,798 | 12/1980 | Schroeter et al. | 428/331 |
| 4,243,720 | 1/1981 | Schroeter et al. | 428/412 |

Primary Examiner—Thomas J. Herbert, Jr.
Attorney, Agent, or Firm—William F. Mufatti

[57] ABSTRACT

A coated polycarbonate article having improved resistance to degradation by ultraviolet radiation, abrasion and attack by chemical solvents comprising a polycarbonate resin article with its surface layers impregnated with an ultraviolet radiation absorbing compound and having deposited on said impregnated surface a coating comprised of (i) a thermoplastic acrylic polymer containing primer layer; and (ii) a top coated disposed on said primer layer containing a colloidal silica filled thermoset organopolysiloxane.

19 Claims, No Drawings

COATED AND ULTRAVIOLET RADIATION STABILIZED POLYCARBONATE ARTICLE

This invention relates to a coated and ultraviolet light stabilized polycarbonate article having superior resistance to abrasion, attack by chemical solvents and degradation by ultraviolet light. In the article of the present invention the polycarbonate resin is stabilized against degradation by ultraviolet light by having impregnated in its surface layers an ultraviolet light absorbing compound. Protection against abrasion and chemical solvents is provided by a coating disposed on said impregnated surface comprised of a colloidal silica filled thermoset organopolysiloxane which is tenaciously and durably adhered to said impregnated surface by means of a primer layer containing a thermoplastic acrylic polymer.

BACKGROUND OF THE INVENTION

Polycarbonate resins, due to their many advantageous properties, are widely used in industry and commerce. One of their uses is as transparent glazing material for windows, windshields, and the like. While polycarbonate resins are easily fabricated into the desired shape and have excellent physical and chemical properties, such as being less dense and having greater breakage resistance than glass, they have a relatively low abrasion and chemical solvent resistance, and like many other organic polymeric materials are subject to degradation by ultraviolet radiation.

In order to overcome this relatively low resistance to abrasion and chemical solvents various protective coatings, which coatings possess greater abrasion and chemical solvent resistance than polycarbonate resins, have been applied onto the surface of polycarbonate resins. However, in order to qualify as a successful coating material for polycarbonate resins there are several requirements that the prospective coating material must meet. The coating material must be harder and more solvent resistant than the polycarbonate resin. The coating material must be compatible with the polycarbonate and must not degrade the polycarbonate such as by crazing the polycarbonate or otherwise adversely affecting the properties of the polycarbonate resin. The coating material must durably adhere to the surface of the polycarbonate. U.S. Pat. Nos. 3,451,838; 3,986,997 and 4,027,073 disclose organopolysiloxane coating compositions and techniques for the application of these organoplysiloxane coatings onto polycarbonate surfaces. While these organoploysiloxane coatings have many desirable properties, e.g., they are hard, abrasion and solvent resistant, and are compatible with the underlying polycarbonate, these organopolysiloxanes do not in all instances possess the requisite degree of adhesion to and durability on the surface of the polycarbonate resin. In order to improve the adhesion of these organopolysiloxane coatings to the polycarbonate substrate it has been suggested to use adhesion promoting layers between the organopolysiloxane and the polycarbonate. However, the use of a primer layer adds an additional degree of complexity and uncertainty to this already difficult amd largely empirical area of coating technology. In order to function effectively the primer material must not only increase the adhesion of the organopolysiloxane coating to the polycarbonate but must also be compatible with both the polycarbonate and the organopolysiloxane. U.S. Pat. No. 3,707,397 describes a process for providing a hard coating, inter alia, on polycarbonate resin by priming the polycarbonate surface with an adhesion promoting thermosettable acrylic polymer and applying onto this primer a thermosettable organopolysiloxane. An article produced by this process, while possessing acceptable initial adhesion of the organopolysiloxane to the polycarbonate, suffers from the disadvantage that upon prolonged exposure to weathering, particularly to sunlight, the organopolysiloxane coating generally tends to lose its initial good adhesion to the polycarbonate resin substrate. Furthermore, the abrasion resistance of the coated article is generally dependent upon the thickness of the thermoset acrylic polymer primer layer. The abrasion resistance of the coated article generally decreases as the thickness of the primer layer increases. The deterioration of the adhesion of the organopolysiloxane coating to the polycarbonate substrate upon exposure to weathering and the decrease of the abrasion resistance of the coated article upon an increase in the primer thickness is generally rectified in articles produced in accordance with the method disclosed in application Ser. No. 956,873, filed Nov. 1, 1978 and assigned to the same assignee as the instant application, which method involves priming the polycarbonate substrate with a thermoplastic acrylic primer before applying the organopolysiloxane top coat thereon.

While these prior art methods generally provide a protective coating for the polycarbonate article effective to protect it from surface abrasion and attack by chemical solvents, they do not, with the exception of Application Ser. No. 956,873, provide protection against degradation by ultraviolet radiation. It would appear at first glance in view of the prior art that there are three methods of protecting the coated article from degradation by ultraviolet radiation: (1) incorporating an ultraviolet radiation absorber into the silicone topcoat; (2) incorporating an ultraviolet radiation absorber into the primer layer; and (3) incorporating an ultraviolet radiation absorber into the polycarbonate resin itself. However, upon closer scrutiny and in light of the mostly empirical knowledge gained in this area each of these three methods generally turns out to contain certain inherent problems. Incorporating the ultraviolet radiation absorbing compound into the silicone top coat generally results in a decrease in the abrasion resistance provided by the silicone. The greater the amount of ultraviolet radiation absorbing compound present in the silicone top coat, the greater the loss of abrasion resistance by the top coat. Thus, if the silicone top coat contains sufficient amounts of ultraviolet radiation absorber to effectively protect the underlying polycarbonate resin from degradation by ultraviolet radiation its abrasion resistance is generally unacceptably lowered. If the ultraviolet radiation absorbing compound is incorporated into the thermoset acrylic polymer primer layer the aforediscussed relationship between primer thickness and abrasion resistance of the silicone top coat comes into effect. In order to effectively protect the polycarbonate resin from ultraviolet radiation the thermoset acrylic primer layer must contain relatively large amounts of ultraviolet radiation absorbing compounds. But in order to contain these relatively large amounts of ultraviolet radiation absorbing compounds the thickness of the primer layer must be increased. However, this increase in thickness of the thermoset acrylic primer layer which is required to accomodate the necessary amounts of ultraviolet radiation absorbing compounds results in a corresponding decrease in the abrasion resistance of the silicone top coat. Incorporating the ultraviolet radiation absorbing compounds in a thermoplastic acrylic primer layer, as disclosed in application Ser. No. 956,873, provides adequate protection against ultraviolet radiation to the underlying polycarbonate resin substrate without sacrificing the abrasion resistance of the silicone top coat. However, incorporating the ultraviolet radiation absorbing compounds into the thermoplastic acrylic polymer primer layer adds yet another additional step to a generally sensitive multistep coating and priming process. Furthermore, incorporating too much ultraviolet radiation absorber in the thermoplastic acrylic primer layer generally tends to adversely affect the adhesion of the silicone top coat to the polycarbonate resin substrate.

The third method of providing protection against ultraviolet radiation involves incorporating the ultraviolet radiation absorbing compound directly into the polycarbonate resin substrate. This method involves either (i) blending the absorber with the bulk polymer, or (ii) impregnating the surface layers of the resin with the absorber. Blending the absorber with the bulk polymer results in the absorber being distributed throughout the entire polymer system. This procedure is both uneconomical, as these ultraviolet radiation absorbing compounds are usually quite expensive, and not completely successful. Since most of the absorber resides in the polymer's interior instead of at the surface where it is most needed, much of the harmful ultraviolet radiation penetrates and deteriorates the surface layers of the polymer structure before reaching the majority of the interiorly distributed absorber. Furthermore, since the concentration of the absorber in the resin is limited by the degree of compatibility of the absorber with the resin, using sufficiently high concentrations of absorber effective to provide adequate surface protection generally tends to adversely affect the physical properties of the polymer. In the surface impregnation technique the ultraviolet radiation absorber resides in the surface regions of the polymer where it is most needed. Examples of typical surface impregnation techniques generally include applying the ultraviolet radiation absorber from a stabilizing solution containing a compound which is aggressive towards the polycarbonate and tends to swell or soften the resin surface thus enabling the absorber to diffuse into the swelled and softened surface of the polycarbonate, as disclosed in U.S. Pat. Nos. 3,892,889 and 4,146,658; melting the ultraviolet radiation absorber on the surface of the polycarbonate resin and allowing the molten absorber to diffuse into the surface layers of the resin, as disclosed in U.S. Pat. No. 3,043,709; and immersing the polycarbonate in a stabilizing solution containing an ultraviolet radiation absorbing compound which is more soluble in the polycarbonate than in the stabilizing solution, as disclosed in U.S. Pat. Nos. 3,309,220 and 3,594,264.

However, the very feature which makes the surface impregnation method appear attractive, i.e., that the ultraviolet radiation absorber is distributed in the surface layers of the polycarbonate resin where it is most needed, also makes this method appear to be untenable to one skilled in the art when this method is used in conjunction with the application of a protective coating onto the polycarbonate surface. The complexity and problems associated with providing a protective coating which adheres tenaciously and durably to a polycarbonate surface have been previously discussed. The modification of a polycarbonate surface by incorporating therein an ultraviolet radiation absorber, as is done by the surface impregnation technique, adds yet further complications to this already complex area of adhering protective coatings to polycarbonate. It is well known to those skilled in the coating art that modifying the surface of polycarbonate by incorporating an additive therein has generally unpredictable and often adverse effects upon the physical properties of the polycarbonate surface. These effects upon the polycarbonate surface depend upon the particular additive employed. It is generally quite well known that the incorporation of certain additives into the surface layers of polycarbonate resin often results in the deterioration of both initial adhesion and durability of adhesion between the polycarbonate surface and a protective coating, such as silicone, applied onto this surface. In view of this one skilled in the art would generally be led to conclude that the incorporation in the surface layers of a polycarbonate resin of an amount of ultraviolet radiation absorbing compound effective to protect the polycarbonate from degradation by ultraviolet radiation would deleteriously affect the adhesion of a protective coating to this modified polycarbonate surface.

There thus exists a need for a means of simply and effectively protecting a polycarbonate resin article from degradation by ultraviolet radiation, from surface abrasion, and from attack by chemical solvents. The present invention provides such a method as well as the article produced by this method.

DESCRIPTION OF THE INVENTION

In accordance with the present invention there is provided a polycarbonate article which is resistant to degradation by ultraviolet radiation, abrasion, and attack by chemical solvents. The article of the present invention comprises a polycarbonate resin substrate having impregnated in its surface layers at least one ultraviolet radiation absorbing compound and having deposited on said impregnated surface a coating comprised of (i) a thermoplastic acrylic polymer containing adhesion promoting primer layer disposed adherently on said impregnated surface, and (ii) a thermoset colloidal silica filled organopolysiloxane top coat adhered to said primer layer.

In accordance with the present invention an article comprised of polycarbonate is formed in a conventional manner, for example by injection molding, extrusion, cold forming, vacuum forming, blow molding, compression molding, transfer molding, and the like. The article may be in any shape and need not be a finished article of commerce, that is, it may be sheet material or film which would be cut or sized or mechanically shaped into a finished article. Therefore, as used herein, the term "article" refers to any shape or form of polycarbonate resin whether finished or stock material.

The aromatic carbonate polymers used in the practice of the instant invention have recurring structural units of the formula

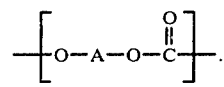

where A is a divalent aromatic radical of the dihydric phenol employed in the polymer producing reaction. These polycarbonate resins are high molecular weight aromatic carbonate polymers which may be prepared by reacting a dihydric phenol with a carbonate precursor such as phosgene, a haloformate or a carbonate ester.

The aromatic carbonate polymers of this invention may be prepared by methods well known in the art and described in U.S. Pat. Nos. 3,161,615; 3,220,973; 3,313,659; 3,312,660; 3,313,777; 3,666,614 and 3,989,672 all of which are incorporated herein by reference.

Also included herein are branched polycarbonates wherein a polyfunctional aromatic compound is reacted with the dihydric phenol and the carbonate precursor to provide a thermoplastic randomly branched polycarbonate wherein the recurring units of Formula I contain branching groups.

The preferred polycarbonate resin is one which may be derived from the reaction of bisphenol-A with phosgene. These preferred polycarbonate resins have from about 10 to about 400 recurring structural units of the general formula

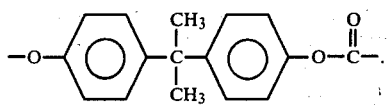

II

The polycarbonate should preferably have an intrinsic viscosity between about 0.3 and about 1.0, more preferably from between about 0.4 to about 0.65 as measured at 25° C. in methylene chloride.

At least one surface of the polycarbonate article, usually the surface which is exposed to the source of ultraviolet radiation, is impregnated with at least one ultraviolet radiation absorbing compound. The ultraviolet radiation absorbing compound is dispersed throughout the surface layers of the polycarbonate article. By surface layers is meant the layers immediately adjacent to and below the surface of the polycarbonate article, and generally including the surface itself.

The ultraviolet radiation absorbing compounds employed in the practice of this invention can be any of the known ultraviolet radiation absorbing compounds which function by reason of their ability to screen out the damaging ultraviolet portion of light due to their very high absorptivity in this region of the spectrum. These compounds include the benzophenone derivatives, benzotriazole derivatives, benzoate esters, phenyl salicylates, derivatives of crotonic acid, malonic acid esters, and cyanoacrylates.

Included among the ultraviolet radiation absorbers which fall into the categories of benzophenone derivatives and benzotriazole derivatives are those compounds disclosed in U.S. Pat. Nos. 3,309,220; 3,049,443 and 2,976,259, all of which are herein incorporated by reference. Some non-limiting examples of these compounds include:

2,2'-dihydroxybenzophenone;
2,2',4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiarybutylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'-tert-butylphenyl)-benzotriazole;
2-(2'-hydroxy-3'-methyl-5'-tert-butylphenyl)-benzotriazole;
2-(2'-hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chlorobenzotriazole; and
2-(2'-hydroxy-3'-di-tert-butylphenyl)-benzotriazole.

Two non-limiting examples of the derivatives of crotonic acid which function as ultraviolet radiation absorbers are alpha-cyano-beta-(p-methoxyphenyl)-crotonic acid methyl ester and alpha-cyano-beta-N-(2-methyl-indolinyl)-crotonic acid methyl ester. The benzoate ester ultraviolet radiation absorbing compounds include the $C_8$–$C_{20}$ alkyl and aryl benzoates, alkyl and aryl hydroxybenzoates, alkaryl and aralkyl benzoates, and aralkyl and alkaryl hydroxybenzoates.

The malonic acid esters which are effective ultraviolet radiation absorbers include the benzylidene malonates. These benzylidene malonates are represented by the general formula

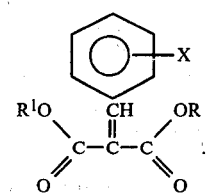

III wherein X is selected from hydrogen, hydroxyl, halogen, alkyl, preferably $C_1$-$C_{10}$ alkyl, and alkoxy, preferably $C_1$-$C_{10}$ alkoxy, radicals; and R and $R^1$ are independently selected from alkyl radicals, preferably alkyl radicals containing from about 1 to about 10 carbon atoms, substituted alkyl radicals, preferably those containing from 1 to about 10 carbon atoms and hydroxyl or halogen substituents, aryl radicals, preferably the phenyl radical, alkaryl radicals, preferably those alkaryl radicals containing from about 7 to about 12 carbon atoms, aralkyl radicals, preferably aralkyl radicals containing from about 7 to about 12 carbon atoms, and substituted aryl radicals, preferably phenyl radicals containing hydroxyl or halogen substituents. Preferred benzylidene malonates represented by formula III are those wherein X represents an alkoxy group and R and $R^1$ are independently selected from alkyl radicals. Examples of these benzylidene malonates include diethyl paramethoxybenzylidene malonate and dimethyl paramethoxybenzylidene malonate.

Among the cyanoacrylates which are useful ultraviolet radiation absorbers are those cyanoacrylates represented by the general formula

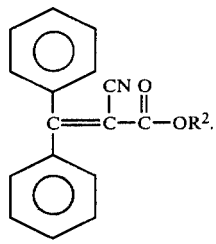

IV wherein $R^2$ is alkyl or hydroxyalkyl. These compounds are disclosed in U.S. Pat. No. 4,129,667 which is incorporated herein by reference.

The preferred ultraviolet radiation absorbing compounds, for the purposes of the present invention, are the benzophenone derivatives, the benzotriazole derivatives, the benzylidene malonates, and the cyanoacrylates.

The amount of the ultraviolet radiation absorbing compound present in the surface layers of the polycarbonate resin is an amount effective to protect the polycarbonate resin against degradation by ultraviolet radiation. Only one ultraviolet radiation absorbing compound may be present in the surface layers of the polycarbonate resin article or two or more ultraviolet radiation absorbing compounds may be dispersed in the surface layers. Generally, a sufficient amount of ultraviolet radiation absorbing compound is present in the surface layers of the polycarbonate resin article so that the absorbance of the polycarbonate at λmaximum is at least one, which corresponds to absorption at λmaximum of at least 90% of the incident ultraviolet radiation by the polycarbonate surface layers. The absorbance is calculated using the relationship $A = \log(I_o/I)$ wherein A is the absorbance, $I_o$ is the intensity of incident light, and I is the intensity of transmitted light.

The ultraviolet radiation absorbing compound can be impregnated into the surface layers of the polycarbonate resin article by any of several methods. One of these methods involves applying the ultraviolet radiation absorber from a solution containing the ultraviolet radiation absorber and a compound which is aggressive towards the polycarbonate resin (such as an organic solvent) and tends to swell and/or soften the resin thus allowing the ultraviolet radiation absorbing compound to diffuse into the softened and/or swelled surface of the polycarbonate. In this method the solution containing the ultraviolet radiation absorbing compound and the polycarbonate aggressive compound is brought into contact with the surface of the polycarbonate resin article and is kept in contact therewith for a period of time effective for the aggressive compound to swell the surface layers of the polycarbonate and for the ultraviolet radiation absorbing compound to diffuse into these swelled surface layers. Some specific examples of this type of technique are described in U.S. Pat. Nos. 3,617,330; 3,892,889 and 4,146,658.

Another method of impregnating the surface layers of a polycarbonate resin article with an ultraviolet radiation absorbing compound involves applying the ultraviolet light absorber onto the surface of the resin article, as for example from a solution, from a dispersion such as a dispersion in water, as a solid in the form of a powder or dust, or as a liquid in the form of a melt, and thereafter heating the coated resin to a temperature above the melting point of the absorber and below the melting point of the polycarbonate resin.

Yet another method of surface impregnating a polycarbonate resin with an ultraviolet light absorber involves immersing a polycarbonate resin article in a bath containing an ultraviolet radiation absorbing compound which is more soluble in the polycarbonate resin than in the bath. Generally, the solvent component of the bath is water or oil. This type of technique of impregnating a polycarbonate resin surface with an ultraviolet radiation absorbing compound is described in U.S. Pat. Nos. 3,309,220 and 3,594,264.

Still another method, and one which is generally preferred, of impregnating the surface regions of a polycarbonate resin article with an ultraviolet radiation absorbing compound involves the utilization of an ultraviolet radiation stabilizing composition containing an ultraviolet radiation absorbing compound and a nonaggressive liquid carrier for said compound. By nonaggressive is meant that the liquid carrier is nonaggressive towards the polycarbonate resin, i.e., it does not attack and deleteriously affect the polycarbonate nor does it cause the polycarbonate surface to soften and swell. Since a nonaggressive ultraviolet radiation stabilizing composition is used there is no degradation or adverse effect on the polycarbonate resin. Furthermore, since the stabilizing composition is nonaggressive towards the polycarbonate the processing step does not need to be as rigidly controlled, with respect to the residence time of the stabilizing composition on the surface of the polycarbonate resin, as in the case of an aggressive stabilizing composition.

There are basically two ways of practicing this preferred method. In the first way a stabilizing composition containing the ultraviolet radiation absorbing compound and the nonaggressive liquid carrier therefore is applied onto the surface of a preheated polycarbonate article by any of several known methods such as spraying, flow coating, brushing, and the like. The ultraviolet radiation stabilizing composition is kept in contact with the preheated polycarbonate resin article for a period of time sufficient for the ultraviolet radiation absorber to effectively impregnate the surface layers of the polycarbonate article, that is for the ultraviolet radiation absorber to be dispersed throughout the surface layers of the polycarbonate article in concentrations sufficient to provide protection against the deleterious effects of ultraviolet radiation. Since the stabilizing composition is nonaggressive towards the polycarbonate there is no upper time limit that the stabilizing composition can remain in contact with the resin surface. Rather, the maximum residence time of the stabilizing composition on the surface of the polycarbonate resin article is governed by such secondary considerations as speed of processing of the polycarbonate article, rate of cooling of the polycarbonate—if the polycarbonate resin article cools below the critical temperature no further diffusion of the absorber into the surface layers of the resin will take place—rate of evaporation of the liquid carrier, and the like. The minimum period of time that the stabilizing composition is kept in contact with the polycarbonate surface is that period of time which is sufficient for the ultraviolet radiation absorbing compound to impregnate the surface layers of the resin article in concentrations effective to protect the polycarbonate resin against degradation by ultraviolet radiation. This minimum period generally depends to a certain degree upon the particular ultraviolet radiation absorbing compound present in the stabilizing composition, the particular nonaggressive liquid carrier present in the stabilizing composition, and the temperature to which the polycarbonate article has been preheated. Generally the ultraviolet radiation stabilizing composition is kept in contact with the preheated polycarbonate surface from about 5 seconds to about 2 hours, preferably from about 30 seconds to about 15 minutes.

It is critical to the process that the polycarbonate resin article be at a temperature sufficiently high when the stabilizing composition is applied thereto for the ultraviolet radiation absorber to impregnate the surface layers thereof in concentrations effective to provide protection against degradation of the polycarbonate by ultraviolet radiation. If the polycarbonate is not at this sufficiently high temperature when the stabilizing composition is contacted therewith the ultraviolet radiation absorber will not diffuse into or impregnate the surface layers of the polycarbonate article and, consequently, the polycarbonate will not be protected against degradation by ultraviolet radiation. Generally, the minimum temperature at which impregnation of the surface layers of the polycarbonate resin article by the ultraviolet radiation absorber takes place is about 65° C. Preferably the polycarbonate article should be at about at least 75° C. as at this temperature and above the ultraviolet radiation absorber generally diffuses quite readily and in large amounts into the surface layers of the polycarbonate resin. The maximum temperature to which the polycarbonate resin is preheated, and therefore the maximum temperature of the polycarbonate resin at the time of contact with the ultraviolet radiation stabilizing composition, is governed by the fact that the temperature of the polycarbonate be not sufficiently high so as to deleteriously affect the physical properties of the polycarbonate resin. Thus the upper temperature limit is below about 150° C. which is the glass transition temperature of the polycarbonate resin. Preferably it should be below about 135° C., the temperature at which bubbles and other imperfections begin to appear in the polycarbonate resin.

Thus in the practice of this method the polycarbonate resin article should be at a temperature between about 65° C. and about 150° C. during contact with the stabilizing composition. For optimum results and optimum operating conditions the polycarbonate article should preferably be at a temperature between about 75° C. and about 135° C. The polycarbonate article is preheated to this temperature before the ultraviolet radiation stabilizing composition is brought into contact with the surface thereof. There is no active heating of the polycarbonate article during the period that the stabilizing composition is in contact with the surface of the article. The stabilizing composition is not heated but is generally at about room temperature at the time of its application onto the surface of the preheated polycarbonate resin article.

The second technique involving the utilization of an ultraviolet radiation stabilizing composition containing an ultraviolet radiation absorbing compound and a nonaggressive liquid carrier therefore comprises applying onto the surface of a polycarbonate resin article the ultraviolet radiation stabilizing composition and thereafter heating the polycarbonate article having a layer of the stabilizing composition on its surface to a temperature effective for the ultraviolet radiation absorber to diffuse into and impregnate the surface layers of the polycarbonate article. Heating at the effective temperature is continued and the stabilizing composition is kept in contact with the surface of the article at the effective temperature for a period of time sufficient for the ultraviolet radiation absorber to effectively impregnate the surface layers of the polycarbonate article, i.e., for the ultraviolet radiation absorber to be dispersed throughout the surface layers of the polycarbonate article in concentrations sufficient to provide protection against the deleterious effects of ultraviolet light. Since the stabilizing composition is nonaggressive towards the polycarbonate there is no upper time limit that the composition can remain in contact with the polycarbonate resin article during heating at the effective temperature. The minimum period of time that the stabilizing composition is kept in contact with the surface of the article at the effective temperature is that period of time which is sufficient for the absorber to impregnate the surface layers of the polycarbonate resin article in concentrations effective to provide protection to the polycarbonate resin against degradation by ultraviolet radiation. This minimum period of time generally depends to a certain degree upon the particular ultraviolet radiation absorbing compound and the particular liquid carrier therefor which are present in the stabilizing composition, and the temperature to which the stabilizing composition coated article is heated. Generally, the article with the stabilizing composition on its surface is actively heated at the effective temperature for a period of time ranging from about 5 seconds to about 2 hours, preferably from about 30 seconds to about 30 minutes.

As in the technique wherein the stabilizing composition is applied onto a preheated polycarbonate surface, so also in this technique it is critical that the polycarbonate article with the stabilizing composition on its surface be heated to a temperature sufficiently high for the ultraviolet radiation absorber to impregnate the surface layers of the article in concentrations effective to provide protection against ultraviolet radiation but insufficiently high for thermal degradation of the polycarbonate resin to occur. Generally, the minimum temperature at which effective impregnation of the surface layers of the polycarbonate resin article occurs is at about 65° C. Preferably the polycarbonate article with a layer of the stabilizing composition disposed on its surface is heated to at least about 75° C., as at this temperature and above the ultraviolet radiation absorber generally diffuses readily and in large amounts into the surface layers of the polycarbonate resin. The maximum temperature to which the coated polycarbonate article can be heated is governed by the fact that this temperature be not sufficiently high so as to deleteriously affect the physical properties of the polycarbonate resin, i.e., that thermal degradation of the polycarbonate resin does not occur. Thus the upper temperature limit is generally below about 150° C. which is the glass transition temperature of polycarbonate resin. Preferably the temperature should be below about 135° C., the point at which bubbles and other imperfections begin to appear in the resin.

In both of these techniques utilizing a nonaggressive stabilizing composition the liquid carrier for the ultraviolet radiation absorbing compound must not only be nonaggressive towards the polycarbonate but it must also wet the polycarbonate surface. Thus, for example, while water is nonaggressive towards polycarbonate it is not an effective liquid carrier for the purpose of the present invention because it does not wet the polycarbonate. The ultraviolet radiation stabilizing composition can contain only one liquid carrier or it may contain two or more of the liquid carriers. If two or more of the liquid carriers are present in the stabilizing composition they should be miscible with each other. The preferred nonaggressive liquid carriers for the ultraviolet absorber include hydroxy ethers, alcohols, alcohol-water mixtures, liquid aliphatic hydrocarbons, liquid cycloaliphatic hydrocarbons, and chlorofluorocarbons such as those marketed by the E. I. duPont Company under the tradename Freon, e.g., dichlorodifluoromethane, trichloromonofluoromethane, and the like. Generally it is preferred that these liquid carriers be relatively volatile, i.e., that they volatilize at or below about 130° C.

The preferred alcohols are the aliphatic alcohols with the alkanols, particularly the $C_1$-$C_6$ alkanols, being preferred. Some nonlimiting examples of these alkanols include methanol, ethanol, propanol, isopropanol, butanol, tertiarybutanol, and the like.

The preferred liquid aliphatic and cycloaliphatic hydrocarbons are the liquid saturated aliphatic and cycloaliphatic hydrocarbons containing from 5 to about 20 carbon atoms. Some nonlimiting examples of these hydrocarbons include pentane, hexane, octane, nonane, decane, undecane, the various positional isomers of the foregoing, cyclopentane, cyclohexane, cyclooctane, and the like.

The hydroxy ethers which are useful as carriers in the ultraviolet radiation stabilizing composition are compounds represented by the formula $$R^3-O-R^4-OH \qquad V.$$

wherein $R^3$ is an alkyl or an alkoxy alkyl radical containing from 1 to about 6 carbon atoms, and $R^4$ is a divalent saturated aliphatic hydrocarbon radical containing from 1 to about 6 carbon atoms.

The ultraviolet radiation stabilizing composition contains from about 0.01 to about 15 weight percent of an ultraviolet radiation absorbing compound, preferably from about 0.1 to about 10 weight percent of an ultraviolet radiation absorber, and more preferably from about 1 to about 8 weight percent of an ultraviolet radiation absorber. The stabilizing composition may contain only one ultraviolet radiation absorbing compound or a combination of two or more ultaviolet radiation absorbing compounds. If two or more ultraviolet radiation absorbing compounds are present in the stabilizing composition their combined weight percentages generally range from about 0.01 to about 15 weight percent of the stabilizing composition. These amounts are generally effective to provide protection to the polycarbonates resin against degradation by ultraviolet radiation.

On the surface of the polycarbonate resin article with its surface layers impregnated with at least one ultraviolet radiation absorbing compound is adherently disposed a primer layer comprised of a thermoplastic acrylic polymer. The thermoplastic acrylic polymer is applied onto the impregnated surface of the polycarbonate article from a priming composition containing the thermoplastic acrylic polymer and a suitable organic solvent therefor.

The thermoplastic acrylic polymers which are employed in the primer layer in accordance with the present invention are those acrylic polymers well known in the art as thermoplastic acrylic polymers. Exemplary thermoplastic acrylic polymers employed in the practice of this invention are set forth, for example, in *Encyclopedia of Polymer Science and Technology*, Vol. 1, Interscience Publishers, John Wiley & Sons, Inc., 1964, at pp. 246 et seq. and the references cited therein, all of which are hereby incorporated by reference.

The term thermoplastic acrylic polymers as used herein is meant to embrace within its scope those thermoplastic polymers resulting from the polymerization of one or more acrylic acid ester monomers as well as methacrylic acid ester monomers. These monomers are represented by the general formula $$CH_2=CYCOOR^5 \qquad VI.$$

wherein Y is hydrogen or a methyl radical and $R^5$ is an alkyl radical, preferably an alkyl radical containing from 1 to about 20 carbon atoms.

Some nonlimiting examples of alkyl groups represented by $R^5$ include methyl, ethyl, n-propyl, isopropyl, n-butyl, isobutyl, sec-butyl, tert-butyl, pentyl, isopentyl, hexyl, and the like.

Some nonlimiting examples of acrylic acid ester monomers represented by formula VI include methyl acrylate, isopropyl acrylate, n-propyl acrylate, n-butyl acrylate, isobutyl acrylate, and 2-ethylhexyl acrylate. Some nonlimiting examples of methacrylic acid ester monomers represented by formula VI include methyl methacrylate, ethyl methacrylate, butyl methacrylate, hexyl methacrylate, isobutyl methacrylate, and propyl methacrylate. Copolymers of the above acrylate and methacrylate monomers are also included within the term thermoplastic acrylic polymers as it appears herein. The polymerization of the monomeric acrylic acid esters and methacrylic acid esters to provide the thermoplastic acrylic polymers useful in the practice of this invention may be accomplished by an of the well known polymerization techniques. The thermoplastic acrylic polymers having a molecular weight of at least about 15,000 are generally preferred in the practice of the instant invention.

The thermoplastic acrylic polymers useful as primers include acrylic homopolymers derived from a single type of acrylic acid ester monomer; methacrylic homopolymers derived from a single type of methacrylic acid ester monomer; and copolymers derived from two or more different acrylic acid ester monomers, two or more different methacrylic acid ester monomers, or an acrylic acid ester monomer and a methacrylic acid ester monomer.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, can also be used in the primer layer.

The thermoplastic acrylic polymers are in general applied as primers onto the impregnated polycarbonate surface from a primer composition containing said thermoplastic acrylic polymer and a relatively volatile solvent, preferably an organic solvent, which is substantially inert towards the polycarbonate, i.e., will not attack and adversely affect the polycarbonate, but which is capable of dissolving the thermoplastic acrylic polymers. Generally the concentration of the thermoplastic acrylic polymer in the primer composition ranges from about 0.5 to about 25 percent by weight, preferably from about 1 yo about 15 percent by weight. Examples of some suitable organic solvents present in the priming composition include ethylene glycol diacetate, butoxyethanol, the lower alkanols, and the like.

The primer composition may also optionally contain various additives such as flatting agents, surface active agents and thixotropic agents. All of these additives and the use thereof are well known in the art and do not require extensive discussion.

A uniform film of the primer composition is applied onto the ultraviolet radiation impregnated polycarbonate surface by any of the known means such as dipping, spraying, roll-coating and the like. After the polycarbonate surface is coated with the primer composition a substantial portion of the volatile solvents present in the primer composition may be removed by drying, either air drying or by the application of mild heat, the coated article until a substantial portion of the volatile solvent is evaporated off leaving a substantially solid primer layer containing a thermoplastic acrylic polymer on the polycarbonate surface. Generally, the primer layer is a uniform film having a thickness varying between about 0.002 mil to about 1 mil, preferably between about 0.01 mil to about 0.5 mil. This primer layer is adhered to the impregnated polycarbonate surface and functions as an adhesion promoting layer for the silicone top coat, which is disposed on the outer surface of this primer layer. In the practice of this invention a top coat composition comprising a colloidal silica filled further curable organopolysiloxane is applied onto the surface of the primer layer and the organopolysiloxane is then cured to form a top coat containing a colloidal silica filled thermoset organopolysiloxane.

One type of colloidal silica filled further curable organopolysiloxane composition useful as the top coat composition in the practice of the present invention is that described in U.S. Pat. Nos. 3,986,997 and 4,027,073, and comprises a dispersion of colloidal silica in a lower aliphatic alcohol-water solution of the partial condensate of a silanol having the formula $R^6Si(OH)_3$  VII.

wherein $R^6$ is selected from the group consisting of alkyl radicals containing from 1 to about 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight solids, said solids consisting essentially of a mixture of from about 10 to about 70 percent by weight of colloidal silica and from about 30 to about 90 percent by weight of the partial condensate of said silanol. The partial condensate of the silanol, i.e., a siloxanol, is preferably obtained entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono-gamma-methacryloxypropyltrisilanol, mono-gamma-glycidoxypropyltrisilanol, mono-3,3,3-trifluoropropyltrisilanol, or mixtures thereof. The composition further contains sufficient acid to provide a pH in the range of from about 3.0 to about 6.0. The pH is maintained in this range in order to prevent premature gellation and increase the shelf life of the colloidal silica filled further curable organopolysiloxane top coat composition and to obtain the optimum properties in the cured coating obtained from this composition. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to the mixing of the two components.

The trisilanol component of this composition is generated in situ by the addition of the corresponding trialkoxysilanes to aqueous dispersions of colloidal silica. Suitable trialkoxysilanes are those containing methoxy, ethoxy, propoxy, isopropoxy and sec-butoxy groups. Upon generation of the silanol in the acidic aqueous medium there is condensation of the hydroxyl substituents to form Si-O-Si bonding. The condensation is not complete, but rather the siloxane retains an appreciable quantity of silicon-bonded hydroxyl groups, thus rendering the partial condensate soluble in the water-alcohol solvent. This soluble condensate can be characterized as a siloxanol polymer having at least one silicon-bonded hydroxyl group per every three -Si-O- units. During curing of the top coat composition, which has been appled as a thin layer onto the surface of the thermoplastic acrylic primer layer, further condensation of the uncondensed silanol groups occurs resulting in the formation of a substantially fully condensed and thermoset (cross-linked) colloidal silica filled organopolysiloxane.

The silica component of the top coat composition is present in the form of colloidal silica. Aqueous colloidal silica dispersions generally have a particle size in the range of from about 5 to about 150 millimicrons in diameter. These silica dispersions are prepared by methods well known in the art and are commercially available. It is preferred to use colloidal silica having a particle size in the range of from about 10 to about 30 millimicrons in diameter in order to obtain dispersions having a greater stability and to provide top coats having superior optical properties.

The colloidal silica filled further curable organopolysiloxane top coat compositions are prepared by adding trialkoxysilanes to colloidal silica hydrosol and adjusting the pH to a range of between 3.0 and 6.0 by the addition of acid. As mentioned previously, the acid can be added to either the silane or the silica hydrosol before these two components are mixed. Alcohol is generated during the hydrolysis of the silanes to the silanols. Depending upon the percent solids desired in the final top coat composition, additional alcohol, water, or a water-miscible solvent can be added. Suitable alcohols are the lower aliphatic alcohols such as methanol, ethanol, isopropanol, tert-butanol, and mixtures thereof. Generally, the solvent system should contain from about 20 to about 75 weight percent alcohol to ensure solubility of the partial condensate of the silanol. If desired, a minor amount of an additional water miscible polar solvent such as acetone, butyl cellosolve, and the like can be added to the water-alcohol solvent system. Generally, sufficient alcohol or water-alcohol mixture is added to provide a composition containing from about 10 to about 50 percent by weight solids, said solids generally comprising from about 10 to about 70 weight percent of colloidal silica and from about 30 to about 90 percent by weight of the partial condensate of the silanol. The composition is allowed to age for a short period of time to ensure the formation of the partial condensate of the silanol. This condensation occurs upon the generation of the silanol in the acidic aqueous medium through the hydroxyl groups to form Si-O-Si bonding. The condensation is not complete, resulting in a siloxane having an appreciable amount of silicon-bonded hydroxyl groups. This aged, colloidal silica filled further curable organopolysiloxane top coat composition is then applied onto the primed polycarbonate surface by any of the commonly known methods such as dipping, spraying, flow-coating and the like. After the top coat composition has been applied onto the primed polycarbonate surface a substantial amount of the volatile solvents present in the top coat composition are evaporated off by either air drying or mild heating. After evaporation of a substantial portion of the solvents from the top coat composition there is left on the surface of the primer layer a generally solid layer comprised of a colloidal silica filled further curable organopolysiloxane. Heat is then applied to this further curable organopolysiloxane to effectuate further condensation of the silanols and the cross-linking of the polymer. The result is a colloidal silica filled thermoset organopolysiloxane top coat which is highly resistant to scratching, abrasion, marring, and attack by organic solvents, and which is tenaciously and durably adhered, by means of the adhesion promoting thermoplastic acrylic polymer containing primer layer, to the ultraviolet radiation absorber impregnated polycarbonate surface. Generally, this top coat contains from about 10 to about 70 weight percent of colloidal silica and from about 30 to about 70 weight percent of the thermoset organopolysiloxane.

The thickness of the cured top coat is generally dependent upon the method of application and upon the weight percent solids present in the top coat composition. In general, the higher the concentration of solids in the top coat composition, and the longer the residence time of the top coat composition on the primed polycarbonate surface, the greater the thickness of the cured top coat. Preferably the cured top coat has a thickness of from about 0.1 to about 0.7 mil, more preferably from about 0.15 to about 0.5 mil, and most preferably from about 0.2 to about 0.3 mil.

DESCRIPTION OF THE PREFERRED EMBODIMENT

In order to more fully and clearly illustrate the present invention the following specific examples are presented. It is intended that the examples be considered as illustrative of rather than limiting the invention disclosed and claimed herein. In the example, all parts and percentages are on a weight basis unless otherwise specified.

EXAMPLE 1

The surface layers of a polycarbonate test panel $4''\times 4''\times \frac{1}{4}''$ are impregnated with an ultraviolet radiation absorbing compound by flow coating the panels with an ultraviolet radiation stabilizing composition comprised of a 5% solution of 2-hydroxy-4-methoxybenzophenone dissolved in butoxyethanol. The coated panels are drained for one minute and are then heated at 125° C. for 15 minutes to surface impregnate the panels with the ultraviolet radiation absorbing compound.

A primer layer containing a thermoplastic acrylic polymer is applied onto the surface impregnated polycarbonate panels by flow coating the panels with a primer composition containing 6 parts by weight of Elvacite 2009 (a medium molecular weight poly(methyl methacrylate) marketed by the E. I. duPont Company) dissolved in 85 parts by weight of butoxyethanol and 9 parts by weight of ethyleneglycol diacetate. The test panels are drained for 15 minutes and are then heated at 125° C. for 30 minutes to evaporate off a substantial amount of the volatile solvents present in the primer composition and to leave a substantially solid primer layer containing a thermoplastic acylic polymer.

A colloidal silica filled thermoset organopolysiloxane top coat is applied onto the primed test panels by flow coating the primed panels with a top coat composition containing about 18% solids, about 50% by these solids being colloidal silica and about 50% of these solids being the partial condensate of $CH_3Si(OH)_3$, in a lower aliphatic alcohol-water system, and having a pH of about 3.9. The panels coated with this top coat composition are drained for 30 minutes and are then baked at 125° C. for one hour to cure the further curable organopolysiloxane to the thermoset state.

EXAMPLE 2

Ultraviolet radiation stabilized, primed and top coated polycarbonate test panels are prepared substantially in accordance with the procedure of Example 1 except that the ultraviolet radiation stabilizing composition contains 5% of 2-(3',5'-di-t-pentyl-2'-hydroxyphenyl)benzotriazole ultraviolet radiation absorbing compound.

EXAMPLE 3

Ultraviolet radiation stabilized, primed and top coated polycarbonate test panels are prepared substantially in accordance with the procedure of Example 1 except that the ultraviolet radiation stabilizing composition contains 5% of dimethyl(p-methoxybenzylidene)-malonate ultraviolet radiation absorbing compound.

EXAMPLE 4

Ultraviolet radiation stabilized, primed and top coated polycarbonate test panels are prepared substantially in accordance with the procedure of Example 1 except that the ultraviolet radiation stabilizing composition contains 5% of ethyl 2-cyano-3,3-diphenylacrylate ultraviolet radiation absorbing compound.

EXAMPLE 5

Ultraviolet radiation stabilized, primed and top coated polycarbonate test panels are prepared substantially in accordance with the procedure of Example 1 except that the ultraviolet radiation stabilizing composition contains 5% of 2-ethylhexyl-2-cyano-3,3-diphenylacrylate ultraviolet radiation absorbing compound.

EXAMPLE 6

This example is illustrative of a prior art primed and top coated, but not ultraviolet radiation stabilized, polycarbonate resin article falling outside the scope of the present invention. The surfaces of polycarbonate test panels 4"×4"×¼ are primed with a thermoplastic acrylic polymer primer layer by flow coating the panels with a primer composition containing 6 parts by weight of Elvacite 2009 dissolved in 85 parts by weight of butoxyethanol and 9 parts by weight of ethyleneglycol diacetate. The test panels are drained for 15 minutes and are then heated at 125° C. for 30 minutes to evaporate off a substantial amount of the volatile solvents present in the primer composition and to leave a substantially solid primer layer containing a thermoplastic acrylic polymer.

A colloidal silica filled thermoset organopolysiloxane top coat is applied onto the primed test panels by flow coating the primed panels with a top coat composition containing about 18% solids, about 50% of these solids being colloidal silica and about 50% of these solids being the partial condensate of CH$_3$Si(OH)$_3$, in a lower aliphatic alcohol-water system, and having a pH of about 3.9. The panels coated with this top coat composition are drained for 30 minutes and are then baked at 125° C. for one hour to cure the further curable organopolysiloxane to the thermoset state.

The test panels prepared in Examples 1-6 are then tested for initial adhesion of the top coat and for adhesion of the top coat after aging in a QUV accelerated weathering device. The results of these tests are set forth in Table I. The adhesion test consists of using a multiple blade tool to cut parallel grooves about 1 mm. apart through the coating into the substrate, rotating the sample 90° and repeating the cutting process thereby forming a grid pattern of 1 mm. squares cut into the coating, and applying an adhesive tape over the cross-hatched area and quickly pulling the tape off. A sample fails the adhesion test if any of the squares in the grid are pulled off. In the QUV accelerated weathering test the samples are inserted into a QUV accelerated weathering device sold by the Q-Panel Company. This device is set to alternating consecutive cycles of fluorescent ultraviolet light at 70° C. for 8 hours and high humidity at 50° C. for 4 hours. The test panels are periodically removed from the QUV accelerated weathering device and subjected to the adhesion test.

TABLE I

| Example No. | Initial Adhesion | No. of Hours of Exposure in the QUV Weathering Device at which Sample Fails the Adhesion Test |
|---|---|---|
| 1 | Pass | Pass after 197 hours |
| 2 | Pass | Pass after 189 hours |
| 3 | Pass | Pass after 197 hours |
| 4 | Pass | Marginal at 189 hours |
| 5 | Pass | Pass after 146 hours, marginal at 197 hours |
| 6 | Pass | Fail at 146 hours |

Samples prepared substantially in accordance with the procedures of Examples 1-5 were all colorless after exposure in the QUV apparatus for the respective time periods shown in Table I. The sample prepared in accordance with the procedure of Example 6, however, was yellow after exposure in the QUV apparatus for 146 hours.

EXAMPLE 7

This example is illustrative of a polycarbonate resin article which is not stabilized against degradation by ultraviolet radiation according to the teachings of the instant invention but which contains an ultraviolet radiation absorber in the silicone top coat. The surfaces of polycarbonate test panels 4"×4"×¼" are primed with a thermoplastic acrylic polymer primer layer by flow coating the panels with a primer composition containing a 7.5% solids solution of Elvacite 2009 dissolved in 80 parts by weight of butoxyethanol and 20 parts by weight of ethyleneglycol diacetate. The test panels are drained and then heated at 125° C. for one hour to evaporate off a substantial amount of the volatile solvents present in the primer composition and to leave a substantially solid primer layer containing a thermoplastic acrylic polymer.

A colloidal silica filld thermoset organopolysiloxane top coat which additionally contains an ultraviolet radiation absorbing compound is appled onto the primed test panels by flow coating the primed panels with a top coat composition containing about 18% solids, about 50% of these solids being colloidal silica and about 50% of these solids being the partial condensate of CH$_3$Si(OH)$_3$, in a lower aliphatic alcohol-water system, and having a pH of about 3.9, and additionally containing 1% of dimethyl(p-methoxybenzylidene)malonate ultraviolet radiation absorber. The primed panels coated with this top coat composition are drained and are then baked at 125° C. for one hour to cure the further curable organopolysiloxane to the thermoset state. These test panels are then subjected to the adhesion test. These test panels pass the adhesion test. However, the coating on these panels is cracked, thus rendering the test panels unacceptable.

EXAMPLE 8

This example illustrates another polycarbonate article falling outside the scope of the present invention for the reason that the ultraviolet radiation absorber is contained in the top coat rather than being impregnated in the surface layers of the polycarbonate substrate. Primed and top coated polycarbonate test panels are prepared substantially in accordance with the procedure of Example 7 except that the top coat composition contains 2% of dimethyl(p-methoxybenzylidene)malonate ultraviolet radiation absorber. These primed and top coated polycarbonate test panels are subjected to the adhesion test. The test panels fail the initial adhesion test.

EXAMPLE 9

The surface layers of a polycarbonate film 2"×4"×1/100" are impregnated with an ultraviolet radiation absorbing compound by flow coating the film with an ultraviolet radiation stabilizing composition comprised of a solution of 1% of dimethyl(p-methoxybenzylidene)malonate dissolved in butoxyethanol. The coated film is drained for less than one minute and then heated at 125° C. for 5 minutes. The treated film is placed in the sample beam of a Perkin-Elmer Model Coleman 575 Spectrophotometer and an untreated film is placed in the reference beam. The absorbance of the treated film is measured, and the amount of ultraviolet light absorbed by the treated film is calculated using the relationship $A = \log(I_o/I)$ where A is the absorbance, $I_o$ is the intensity of incident ultraviolet light, and I is the intensity of transmitted ultraviolet light. The results are set forth in Table II.

EXAMPLE 10

An ultraviolet radiation stabilized polycarbonate film is prepared substantially in accordance with the procedure of Example 9 except that the ultraviolet radiation stabilizing composition contains 2% of dimethyl(p-methoxybenzylidene)malonate. Absorbance of this film is determined according to the procedure of Example 9 and the results are set forth in Table II.

EXAMPLE 11

An ultraviolet radiation stabilized polycarbonate film is prepared substantially in accordance with the procedure of Example 9 except that the ultraviolet radiation stabilizing composition contains 3% of dimethyl(p-methoxybenzylidene)malonate ultraviolet radiation absorber. Absorbance of this film is determined according the the procedure of Example 9 and the results are set forth in Table II.

EXAMPLE 12

An ultraviolet radiation stabilized polycarbonate film is prepared substantially in accordance with the procedure of Example 9 except that the ultraviolet radiation stabilizing composition contains 1% of 2,2',4,4'-tetrahydroxybenzophenone ultraviolet radiation absorber. Absorbance of this film is determined according to the procedure of Example 9 and the results are set forth in Table II.

EXAMPLE 13

An ultraviolet radiation stabilized polycarbonate film is prepared substantially in accordance with the procedure of Example 9 except that the ultraviolet radiation stabilizing composition contains 2% of 2,2',4,4'-tetrahydroxybenzophenone ultraviolet radiation absorber. Absorbance of this film is determined according to the procedure of Example 9 and the results are set forth in Table II.

EXAMPLE 14

An ultraviolet radiation stabilized polycarbonate film is prepared substantially in accordance with the procedure of Example 9 except that the ultraviolet radiation stabilizing composition contains 3% of 2,2',4,4'-tetrahydroxybenzophenone ultraviolet radiation absorber. Absorbance of this film is determined according to the procedure of Example 9 and the results are set forth in Table II.

TABLE II

| Example Number | Absorbance at λ maximum | % UV-light Absorbed at λ maximum |
|---|---|---|
| 9 | 1.17 | 93% |
| 10 | 2.64 | >99% |
| 11 | >3 | >99.9% |
| 12 | 0.87 | 88% |
| 13 | 1.77 | 98% |
| 14 | 2.61 | >99% |

It is clear from the data in Table I that the adhesion after exposure to weathering of the colloidal silical filled silicone top coat to the ultraviolet radiation surface stabilized polycarbonate articles of the present invention, i.e., Examples 1-5, is superior than that of the prior art polycarbonate articles which do not contain an ultraviolet radiation absorber dispersed in their surface layers, i.e., Example 6. This is rather surprising as it is well known that modification of the surface of a polycarbonate resin by the inclusion therein of an additive produces unexpected and unpredictable effects on the adhesion of coatings to this treated surface. These effects are oftentimes negative in that the adhesion, both initial and after exposure to weathering, but particularly the adhesion after exposure to weathering, of the coating to the treated polycarnate surface is adversely affected. The articles of the present invention not only possess superior adhesion of the silicone top coat to the polycarbonate substrate than the prior art articles, but are also resistant to degradation by ultraviolet radiation.

Examples 7 and 8 clearly illustrate that incorporating the ultraviolet radiation absorbing compound in the silicone top coat results in an adverse effect on the physical characteristics of the coating, i.e., cracking, and upon the adhesion of the silicone top coat to the primed polycarbonate substrate.

Table II illustrates the fact that treating polycarbonate resins with the preferred ultraviolet radiation stabilizing composition, i.e., a composition containing an ultraviolet radiation absorbing compound and a nonaggressive liquid carrier therefor, results in a resin whose surface areas absorb the great majority of incident ultraviolet radiation. This protection against ultraviolet radiation is achieved without any visible deleterious effect on the surface characteristics of the treated polycarbonate resin.

While one particularly preferred colloidal silica filled further curable organopolysiloxane top coat composition has been described in detail hereinbefore, this is not the only type of colloidal silica filled further curable organopolysiloxane top coat composition which can be utilized in producing the colloidal silica filled thermoset organopolysiloxane top coat of the present invention. Another colloidal silica filled further curable organopolysiloxane containing top coat composition which might be used is that described in U.S. Pat. No. 4,159,206. This composition comprises about 30–50 parts by weight of a colloidal silica and about 50–70 parts by weight of (i) dialkyldialkoxysilane and (ii) alkyltrialkoxysilane wherein the weight ratio of (i) to (ii) is from about 1:19 to about 1:4.

In this composition the silanes generate the corresponding silanols in situ by the addition of the corresponding di- and trialkoxysilanes to acidic aqueous dispersions of colloidal silica. The resulting composition comprises a dispersion of colloidal silica in the lower aliphatic alcohol-water solution of the partial condensate of a mixture of silanols, one having the formula $R^7Si(OH)_3$ and one having the formula $R^8R^7Si(OH)_2$ in which $R^7$ and $R^8$ are selected independently from the group consisting of alkyl radicals of 1 to 3 inclusive carbon atoms, the vinyl radical, the 3,3,3-trifluoropropyl radical, the gamma-glycidoxypropyl radical, the gamma-acryloxypropyl radical, and the gamma-methacryloxypropyl radical, said composition containing 10 to 50 weight percent solids, the ratio of colloidal silica to partial condensate being from about 1:1 to about 3:7 by weight, said composition containing sufficient acid to provide a pH in the range of 3.0 to 6.0.

The nonvolatile solids portion of this coating composition is a mixture of colloidal silica and the partial condensate of a mixture of silanols. The silanols are generated in situ by hydrolysis of the corresponding mixture of (i) dialkyldialkoxysilane and (ii) alkyltrialkoxysilane. The weight ratio of (i) to (ii) is from about 1:19 to about 1:4. Suitable dialkoxy and trialkoxysilanes are those containing methoxy, ethoxy, isopropoxy and t-butoxy substituents, which upon hydrolysis liberate the corresponding alcohol, thereby generating at least a portion of the alcohol present in the composition. Upon generation of the silanol in the acidic aqueous medium, there is condensation of the hydroxyl substituents to form -Si-O-Si- bonding. The condensation is not complete, but rather the siloxane retains an appreciable quantity of silicon-bonded hydroxyl groups, thus rendering the polymer soluble in the water-alcohol solvent. This soluble partial condensate can be characterized as a siloxanol polymer having at least one silicon-bonded hydroxyl group per every three -SiO- units.

Upon curing there is further condensation of the silanols and cross linking to form a thermoset organopolysiloxane.

From the foregoing it is quite evident that the instant invention provides both articles, and a method of producing these articles, which are resistant to degradation by ultraviolet light, abrasion and chemical solvent attack and which yet retain all of the desirable and excellent physical and chemical properties of unstabilized and uncoated polycarbonate resin.

The foregoing disclosure of this invention is not to be considered as limiting, since many variations may be made by those skilled in the art without departing from the scope or spirit of the foregoing description.

What I claim as new and desire to secure by Letters Patent of the United States is:

1. An improved coated polycarbonate resin article exhibiting improved resistance to degradation by ultraviolet radiation comprising a polycarbonate resin substrate having durably adhered to at least one surface thereof a coating comprised of (i) an adhesion promoting primer layer containing a thermoplastic acrylic polymer disposed on said surface, and (ii) adherently disposed on said primer layer a top coat layer containing a colloidal silica filled thermoset organopolysiloxane; the improvement consisting essentially of the surface layers of said surface of the substrate on which said coating is disposed being impregnated with at least one ultraviolet radiation absorbing compound.

2. The article of claim 1 wherein said ultraviolet radiation absorbing compound is selected from the group consisting of benzophenone derivatives, benzotriazole derivatives, benzylidene malonates, and cyanoacrylates.

3. The article of claim 1 wherein said top coat layer contains from about 10 to about 70 weight percent of colloidal silica.

4. The article of claim 3 wherein said top coat layer contains from about 30 to about 90 weight percent of the condensation product of at least one silanol.

5. The article of claim 4 wherein said silanol is selected from the group represented by the formula $R^6Si(OH)_3$ wherein $R^6$ is selected from the group consisting of alkyl radicals, the vinyl radical, the 3,3,3-trifluoropropyl radical, the gamma-glycidoxypropyl radical, and the gamma-methacryloxpropyl radical, at least 70 weight percent of said silanol being $CH_3Si(OH)_3$.

6. The article of claim 5 wherein said silanol is $CH_3Si(OH)_3$.

7. The article of claim 5 wherein said ultraviolet radiation absorbing compound is selected from the group consisting of benzophenone derivatives, benzotriazole derivatives, benzylidene malonates, and cyanoacrylates.

8. The article of claim 7 wherein said benzylidene malonates are represented by the formula

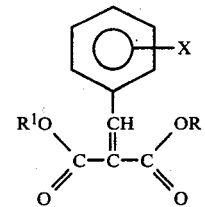

wherein X is selected from hydrogen, hydroxyl, halogen, alkyl, and alkoxy radicals; and R and $R^1$ are independently selected from alkyl, substituted alkyl, aryl, substituted aryl, alkaryl, and aralkyl radicals.

9. The article of claim 7 wherein said cyanoacrylates are selected from compounds represented by the formula

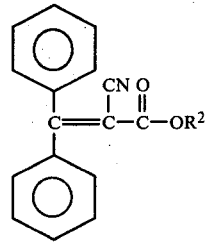

wherein $R^2$ is an alkyl or a hydroxyalkyl radical.

10. The article of claim 7 wherein said polycarbonate resin substrate is non-opaque.

11. An improved coated polycarbonate article exhibiting improved resistance to degradation by ultraviolet radiation comprising a polycarbonate resin substrate having adherently disposed on at least one surface thereof (i) an adhesion promoting primer layer containing a thermoplastic acrylic polymer, and (ii) adherently disposed on said primer layer a top coat layer containing the cured product of a composition comprised of a dispersion of colloidal silica is a lower aliphatic alcohol-water solution of the partial condensate of at least one silanol, said composition containing from about 10 to about 50 weight percent solids comprised of from about 10 to about 70 weight percent colloidal silica and from about 30 to about 90 weight percent of the partial condensate; the improvement consisting essentially of the surface layers of the surface of said substrate on which said primer layer is disposed being impregnated with at least one ultraviolet radiation absorbing compound.

12. The article of claim 11 wherein said ultraviolet radiation absorbing compound is selected from the group consisting of benzophenone derivatives, benzotriazole derivatives, benzylidene malonates, and cyanoacrylates.

13. The article of claim 11 wherein said silanol is selected from the group of silanols represented by the formula $R^6Si(OH)_3$ wherein $R^6$ is selected from alkyl radicals, the vinyl radical, the 3,3,3-trifluoropropyl radical, the gamma-glycixoxypropyl radical, and the gamma-methacryloxypropyl radical, at least 70 weight percent of the silanol being $CH_3Si(OH)_3$.

14. The article of claim 13 wherein said top coat composition contains sufficient acid to provide a pH in the range of 3.0 to 6.0.

15. The article of claim 14 wherein said silanol is $CH_3Si(OH)_3$.

16. The article of claim 14 wherein said ultraviolet radiation absorbing compound is selected from the group consisting of benzophenone derivatives, benzotriazole derivatives, benzylidene malonates, and cyanoacrylates.

17. The article of claim 16 wherein said benzylidene malonates are represented by the formula

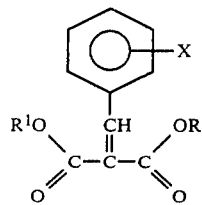

wherein X is selected from hydrogen, hydroxyl, halogen, alkyl, and alkoxy radicals; and R and $R^1$ are independently selected from alkyl, substituted alkyl, aryl, substituted aryl, alkaryl, and aralkyl radicals.

18. The article of claim 16 wherein said cyanoacrylates are represented by the formula

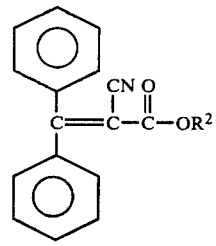

wherein $R^2$ is an alkyl or a hydroxyalkyl radical.

19. The article of claim 16 wherein said polycarbonate resin substrate is non-opaque.

* * * * *